United States Patent [19]

Okamoto

[11] Patent Number: 5,424,968
[45] Date of Patent: Jun. 13, 1995

[54] PRIORITY ENCODER AND FLOATING-POINT ADDER-SUBSTRACTOR

[75] Inventor: Fuyuki Okamoto, Tokyo, Japan
[73] Assignee: NEC Corporation, Tokyo, Japan
[21] Appl. No.: 44,411
[22] Filed: Apr. 8, 1993

[30] Foreign Application Priority Data

Apr. 13, 1992 [JP] Japan .................................. 4-091310

[51] Int. Cl.⁶ .......................... G06F 7/38; G06F 7/00; G06F 15/00
[52] U.S. Cl. .................................. 364/748; 364/715.04
[58] Field of Search ................. 364/748, 715.04, 715.1, 364/715.09, 715.11

[56] References Cited

U.S. PATENT DOCUMENTS 4,794,557 12/1988 Yoshida et al. ................. 364/715.04
5,204,825 4/1993 Ng .................................... 364/715.04

Primary Examiner—Roy N. Envall, Jr.
Assistant Examiner—Emmanuel Moise
Attorney, Agent, or Firm—Whitham, Curtis, Whitham & McGinn

[57] ABSTRACT

A priority encoder for a normalization at a floating-point addition of subtraction for encoding a leading zero number of a difference of two input binary numbers within an error of $-1$, and a floating-point adder-subtractor using this priority encoder. The priority encoder includes a pre-encoder for outputting an n-bit bit string $Q$ ($=Q_n, Q_{n-1}, \ldots$ and $Q_1$,) from a combination $(X_i, Y_i, X_{i-1}, Y_{i-1})$ of ith and (i$-$1)th digits of input two binary numbers X and Y, and a conventional priority encoder circuit for encoding the bit string Q output from the pre-encoder. The floating-point adder-subtractor includes the priority encoder operating in parallel with a mantissa add-subtract circuit so as to output the leading zero number of the difference between the two binary numbers X and Y.

1 Claim, 3 Drawing Sheets

PRIORITY ENCODER AND FLOATING-POINT ADDER-SUBSTRACTOR

BACKGROUND OF THE INVENTION

The present invention relates to a priority encoder and a floating-point adder-subtractor for a normalizing processing in floating-point adding and subtracting operations.

DESCRIPTION OF THE RELATED ART

A priority encoder is a circuit for outputting a binary-numbered position of '1' firstly appeared by counting from an upper side of an input binary number. A conventional priority encoder encodes a number (leading zero number) of zeros continuously aligned before the first appeared '1' counted from the MSB (most significant bit) of the input binary number. A conventional floating-point adder-subtractor is constructed by using this conventional priority encoder.

As shown in FIG. 1, a conventional floating-point adder-subtractor is comprised of a comparator and digit aligner circuit 1 which compares two input operands OP1 and OP2 with each other and controls the digit positions of their mantissa parts to output mantissas M1 and M2, a mantissa add-subtract circuit 2 for performing an adding or subtracting of the mantissas M1 and M2 output from the comparator and digit aligner circuit 1, and a normalizing circuit 3 for carrying out a normalization of an output of the mantissa add-subtract circuit 2.

The normalizing circuit 3 includes a conventional priority encoder 31, a barrel shifter 32 and an exponent update circuit 33.

Next, the operation of the above-described conventional floating-point adder-subtractor will now be described. First, the comparator and digit aligner circuit 1 compares the two input operands OP1 and OP2 with each other to selectively output an exponent part EL of the larger operand and controls the digit positions of the mantissa parts of the input operands OP1 and OP2 to output the mantissas M1 and M2. Next, the mantissa add-subtract circuit 2 performs the adding or subtracting of the mantissas M1 and M2 output from the comparator and digit aligner circuit 1 to output an added or subtracted mantissa value SM. Then, the normalizing circuit 3 carries out the normalization of the added or subtracted mantissa value SM fed from the mantissa add-subtract circuit 2. That is, in the normalizing circuit 3, the added or subtracted mantissa value SM is shifted until the MSB becomes '1', and the exponent is renewed depending on the shift amount of the added or subtracted mantissa value SM.

The priority encoder 31 encodes the number of the zeros continuously aligned from the MSB to the preceding position of the first '1' in the added or subtracted mantissa value SM, that is, a leading zero number LZ. The barrel shifter 32 for the normalization shifts the added or subtracted mantissa value SM by using the leading zero number LZ as the shift amount. Also, the exponent update circuit 33 renews the exponent by adding or subtracting the leading zero number LZ to or from the exponent part EL of the larger operand to output an arithmetic result R. As described above, by these operations, the floating-point addition or subtraction of the two input operands OP1 and OP2 is performed and the arithmetic result R is output.

However, since the conventional priority encoder calculates the leading zero number for one input number and can not calculate the leading zero number for the difference between the two input numbers, in the conventional floating-point adder-subtractor using this priority encoder, the leading zero number of the added or subtracted mantissa value is encoded by the priority encoder, and then the shifting of the mantissa is performed by using the leading zero number as the shift amount. That is, in this case, it is required to successively carry out the encoding and the shifting in series, and thus the processing time is long.

SUMMARY OF THE INVENTION

It is therefore an object of the present invention to provide a priority encoder in view of the aforementioned defects of the prior art, which is capable of achieving a quick processing.

It is another object of the present invention to provide a floating-point adder-subtractor in view of the aforementioned defects of the prior art, which is capable of achieving quick processing and performing an exact normalization.

In accordance with one aspect of the present invention, there is provided a priority encoder, comprising a pre-encoder circuit for inputting two n-bit binary numbers $X$ ($=X_n, X_{n-1}, \ldots$ and $X_1$) and $Y$ ($=Y_n, Y_{n-1}, \ldots$ and $Y_1$), wherein $X \geq Y$, and outputting an n-bit bit string $Q$ ($=Q_n, Q_{n-1}, \ldots$ and $Q_1$,) to be either $Q_i=1$ when a combination ($X_i, Y_i, X_{i-1}, Y_{i-1}$) of ith and (i−1)th digits of the binary numbers $X$ and $Y$ is one of (1, 0, 0, 0), (1, 0, 1, 0), (1, 0, 1, 1), (0, 1, 0, 0), (0, 1, 1, 1), and (0, 1, 1, 0), or $Q_i=0$ otherwise, wherein $i=1, 2, 3, \ldots, n$; and priority encoder means for encoding a leading zero number of zeros continuously aligned from a most significant digit to a preceding position of a first '1' appeared by counting from the most significant digit of an input n-bit binary number so as to encode the bit string $Q$ fed from the pre-encoder circuit.

In accordance with another aspect of the present invention, there is provided a floating-point adder-subtractor, comprising a comparator and digit aligner circuit for comparing input first and second operands of floating-point data with each other to selectively output an exponent part of the larger operand and controlling digit positions of mantissa parts of the first and second operands to output first and second mantissas as controlled mantissa parts; a mantissa add-subtract circuit for carrying out an add-subtract operation of the first and second mantissas to output an added-subtracted mantissa value; and a normalizing circuit for performing a normalization of the added-subtracted mantissa value, the normalizing circuit including a priority encoder specified in claim 1 for encoding a leading zero number of a difference between the first and second mantissas: a left barrel shifter for shifting the added-subtracted mantissa value by using an output of the priority encoder as a shift amount; and a correction shifter for further shifting an output of the left barrel shifter one bit when a most significant bit of the output of the left barrel shifter is '0'.

The priority encoder means outputs either the leading zero number of a difference between the two binary numbers $X$ and $Y$ or one smaller number than this leading zero number.

In the priority encoder according to the present invention, a pre-encoder constituted by at most 5 stages of logic circuits is provided on an input side of a conventional priority encoder. The priority encoder calculates the leading zero number of the difference D (=X−Y) between the input two binary numbers X and Y (X≧Y) whose magnitude relationship is known, without calculating X−Y. However, the priority encoder may generate an error of −1. In comparison with the conventional priority encoder for calculating the difference D, the priority encoder of the present invention can realize a processing with a small amount of hardware and a short delay time.

When the floating-point adder-subtractor is constructed by using this priority encoder of the present invention, in the normalization processing after the mantissa addition or subtraction, the priority encoder can be operated in parallel with the mantissa add-subtract circuit with the input in common, and the normalization operation can be performed right after the mantissa addition or subtraction. Also, when the error of −1 is included in the calculated leading zero number, this can be discriminated by the fact that the MSB of the output of the left barrel shifter as a barrel shifter for the normalization becomes '0', and the output of the left barrel shifter is further shifted one bit to the left by the correction shifter. As a result, the exact normalization can be carried out.

By comparing the processing time between the conventional and present floating-point adder-subtractors, since the processing of the priority encoder can be executed in parallel with the mantissa addition or subtraction processing in the floating-point adder-subtractor of the present invention, the apparent delay time can be cut and thus the quick processing can be achieved.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
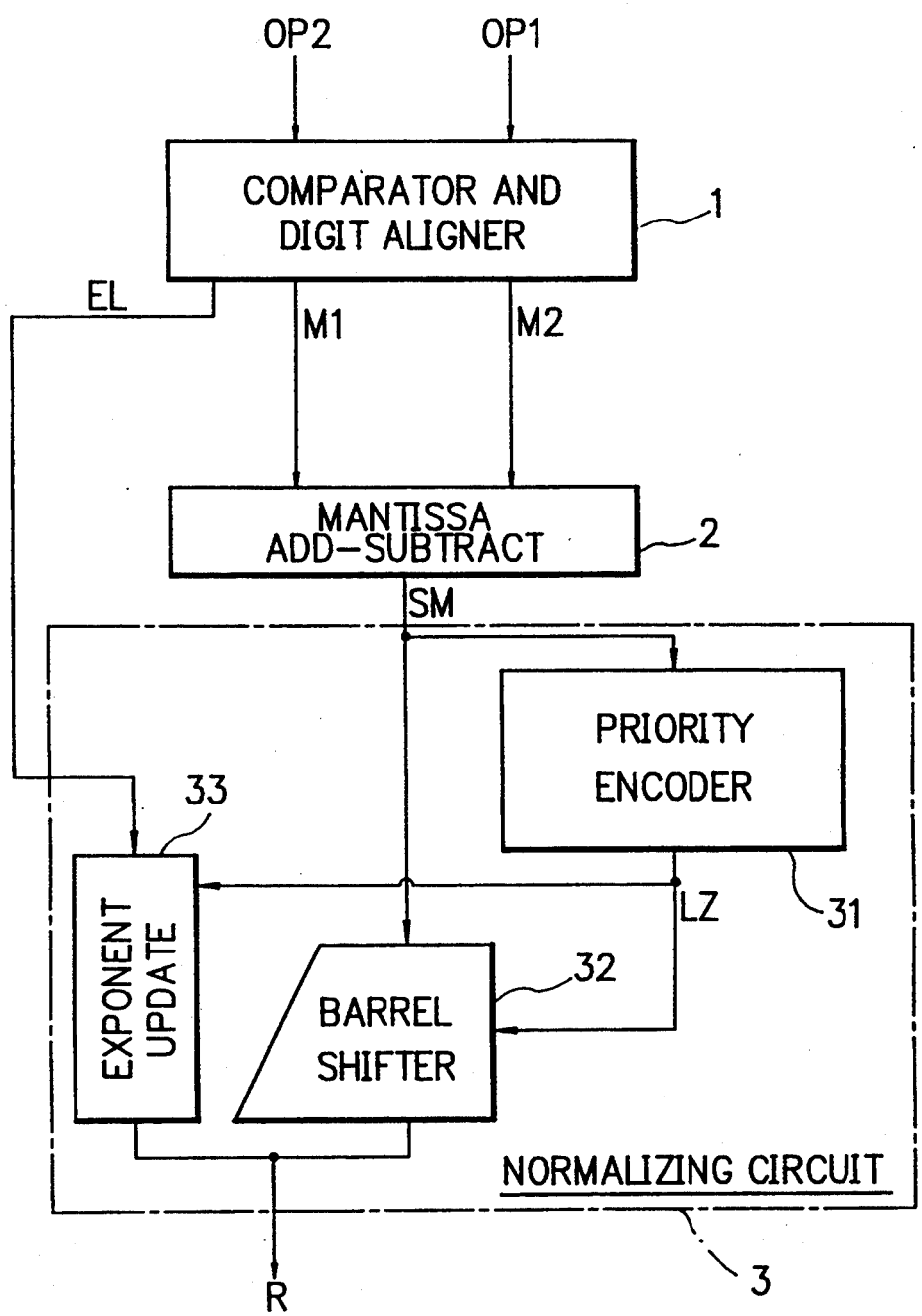
FIG. 1 is a block diagram of a conventional floating-point adder-subtractor including a conventional priority encoder.
Figure 2:
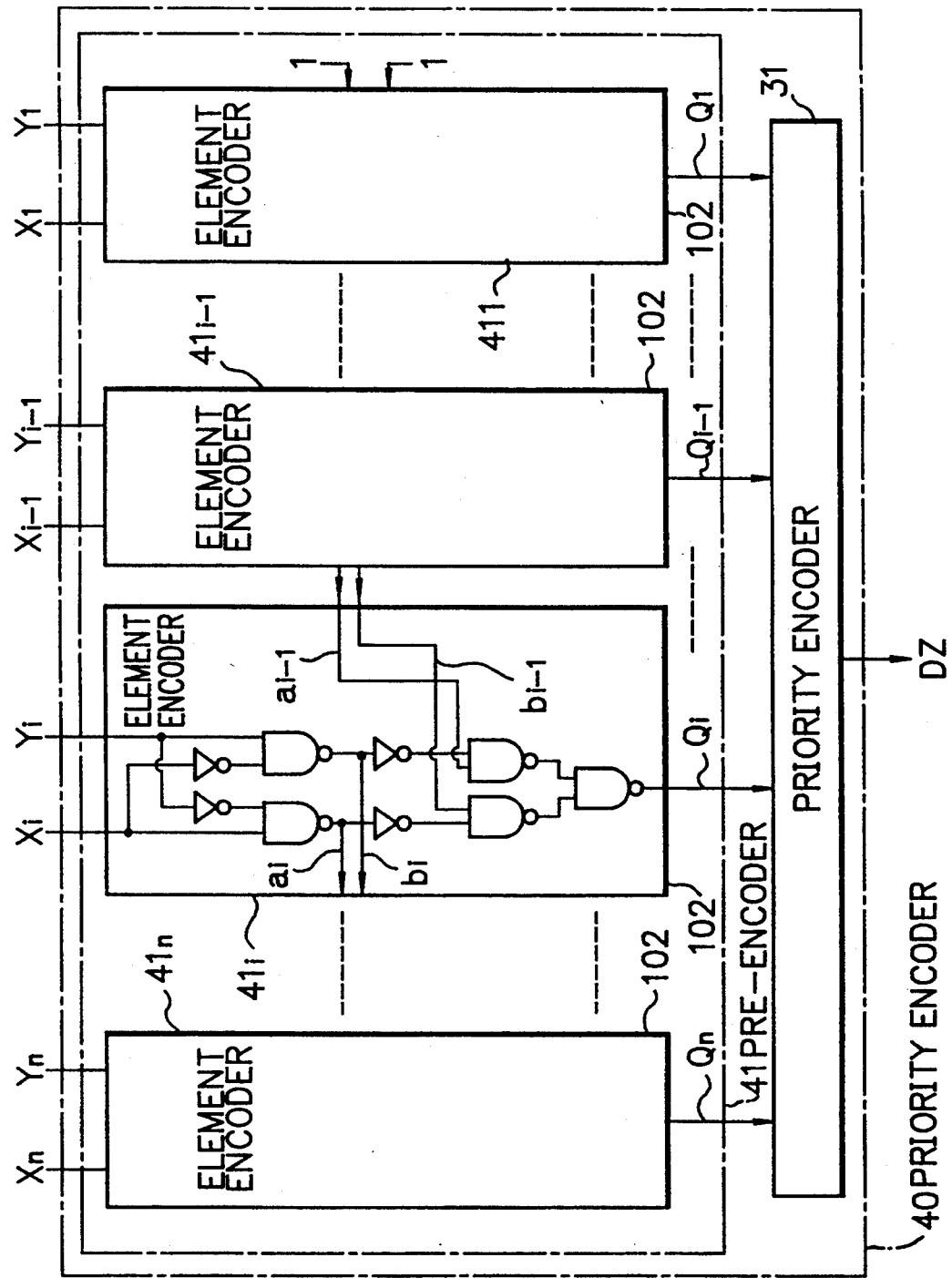
FIG. 2 is a block diagram of a priority encoder according to the present invention.

Referring now to the drawings, wherein like reference characters designate like or corresponding parts throughout the views and thus the repeated description thereof can be omitted for brevity, there is shown in FIG. 2 one embodiment of a priority encoder according to the present invention.

As shown in FIG. 2, the priority encoder 40 is comprised of a pre-encoder 41 including an n number of element encoders 411—41i—41n, and a priority encoder 31 of a conventional type.

Next, the operation of the priority encoder 40 shown in FIG. 2 will now be described in detail.

The pre-encoder 41 inputs two n-bit binary numbers X (=$X_n$, $X_{n-1}$, ... and $X_1$) and Y (=$Y_n$, $Y_{n-1}$, ... and $Y_1$), wherein X≧Y, and outputs an n-bit bit string Q (=$Q_n$, $Q_{n-1}$, ... and $Q_1$). The bit string Q output from the pre-encoder 41 is input to the priority encoder 81 and is encoded therein. The priority encoder 31 outputs a leading zero number of a value having a difference D=X−Y or a one smaller value than the leading zero number.

First, the operational principle will now be described. Now, a subtraction between the two numbers X and Y is considered, but a sign bit is not considered. In the following examples, in case of the difference D: X−Y, it is considered which digit the first '1' is positioned in by counting from the MSB (this is considered as the xth digit). Also, it is assumed that the digit of the position ($X_1$, $Y_1$)=(1, 0) firstly obtained by scanning from the MSB is the ath digit. When no borrow from the lower digit than the ath digit to the ath digit is present, the ath digit is the xth digit to be obtained as follows:

$$
\begin{array}{r}
\text{the ath digit} \quad\downarrow \\
X = 100111000 \\
-)\ Y = 100100011 \\
\hline
D = 000010101 \\
\uparrow \\
\text{the xth digit} \\
Q = 000011001
\end{array} \quad (1)
$$

However, when the borrows to the ath digit are present, the xth digit to be obtained becomes a further lower digit than the ath digit as follows:

$$
\begin{array}{r}
\text{the ath digit} \longrightarrow \text{borrows} \\
\downarrow \\
X = 100110000 \\
-)\ Y = 100101111 \\
\hline
D = 000000001 \\
\uparrow \\
\text{the xth digit} \\
Q = 000000001
\end{array} \quad (2)
$$

Now, it can be conceivable that the difference D=X−Y is calculated by the subtractor and then the leading zero number is calculated. However, in such a system, a processing time and a hardware amount are considerably increased.

In the priority encoder 40 of this embodiment, the pair of every two digits such as ($X_i$, $Y_i$, $X_{i-1}$, $Y_{i-1}$) is scanned from the MSB, that is, the nth digit.

First, as represented by calculations (3) and (4), it is considered that the (a−1)th digit just lower than the ath digit of the position ($X_a$, $Y_a$)=(1, 0) firstly obtained by scanning from the MSB is ($X_{a-1}$, $Y_{a-1}$)=(0, 0). When there is no borrow from the (a−2)th digit to the ath digit, x=a.

$$
\begin{array}{r}
\text{the ath digit} \\
\downarrow \\
X = 1101101100 \\
-)\ Y = 1101000010 \\
\hline
D = 0000101010 \\
\uparrow \\
\text{the xth digit} \\
Q = 0000101010
\end{array} \quad (3)
$$

In turn, when there are the borrows from the (a−2)th digit to the ath digit, x=a−1.

```
      the ath digit ─┐  borrows                    (4)
                     ↓
          X  = 1101100000
         -) Y = 1101001110
          D  = 0000010010
                   ↑
                   └─── the xth digit

Q  = 0000100000
```

Next, a case of $(X_a, Y_a, X_{a-1}, Y_{a-1})=(1, 0, 1, 0)$ or $(1, 0, 1, 1)$ is considered. In this case, regardless of the presence or absence of the borrow from the $(a-2)$-th digit to the ath digit, $x=a$ as follows:

```
                ┌── the ath digit                  (5)
                ↓
          X  = 11011101100
         -) Y = 11010010000
          D  = 00001011100
                    ↑
                    └── the xth digit

Q  = 00001011100 the ath digit ──┐                            (6)
                      ↓
          X  = 11011101100
         -) Y = 11010100001
          D  = 00001001011
                    ↑
                    └── the xth digit

Q  = 00001001101
```

Lastly, a case of $(X_a, Y_a, X_{a-1}, Y_{a-1})=(1, 0, 0, 1)$ is considered. In this case, the bth digit that the borrow is firstly generated is the digit of the position $(X_b, Y_b, X_{b-1}, Y_{b-1})=(0, 1, 0, 0)$ or $(0, 1, 1, 1)$. When no borrow from the $(b-2)$th digit to the ath digit is present, $x=b$.

```
                    borrows                        (7)
      the ath digit ──┐  ┌── the bth digit
                      ↓  ↓
          X  = 10100000111
         -) Y = 10011111101
          D  = 00000001010
                       ↑
                       └── the xth digit

Q  = 00000001010
```

Also, when the borrows from the $(b-2)$th digit to the ath digit are present, $x=b-1$.

```
                    borrows                        (8)
      the ath digit ──┐  ┌── the bth digit
                      ↓  ↓
          X  = 10100000100
         -) Y = 10011111111
          D  = 00000000101
                       ↑
                       └── the xth digit

Q  = 00000001001
```

Next, a numeric string $Q (=Q_n, Q_{n-1}, \ldots$ and $Q_1)$ of an n-bit length is defined as follows:

$Q_i=1$ when $(X_i, Y_i, X_{i-1}, Y_{i-1})=(1, 0, 0, 0), (1, 0, 1, 0), (1, 0, 1, 1), (0, 1, 0, 0), (0, 1, 1, 1), (0, 1, 1, 0)$, or $Q_i=0$ otherwise, wherein $i=1, 2, 3, \ldots, n$.

It is apparent from the above explanation that, when the leading zero number relating to this Q is obtained, it is the leading zero number of the difference D or the one smaller number than this. Also, calculations (1) to (8) represent this Q.

The priority encoder 40 shown in FIG. 2 is constructed on the basis of the above-described operational principle. The logic circuits are constructed so that each of the element encoders 411-41i-41n of the pre-encoder 41 may output $Qi=1$ when an answer of $(1X_i, X_{i-1})-(0Y_i, Y_{i-1})$ has a form of (x1x) (x is 1 or 0), or $Qi=0$ otherwise. The output Q of the pre-encoder 41 is input to the priority encoder 31 and is encoded therein. An output of the priority encoder 31 is the leading zero number of the difference D or the one smaller number than this.

Next, one embodiment of a floating-point adder-subtractor using a priority encoder according to the present invention will now be described in connection with FIG. 3.

Figure 3:
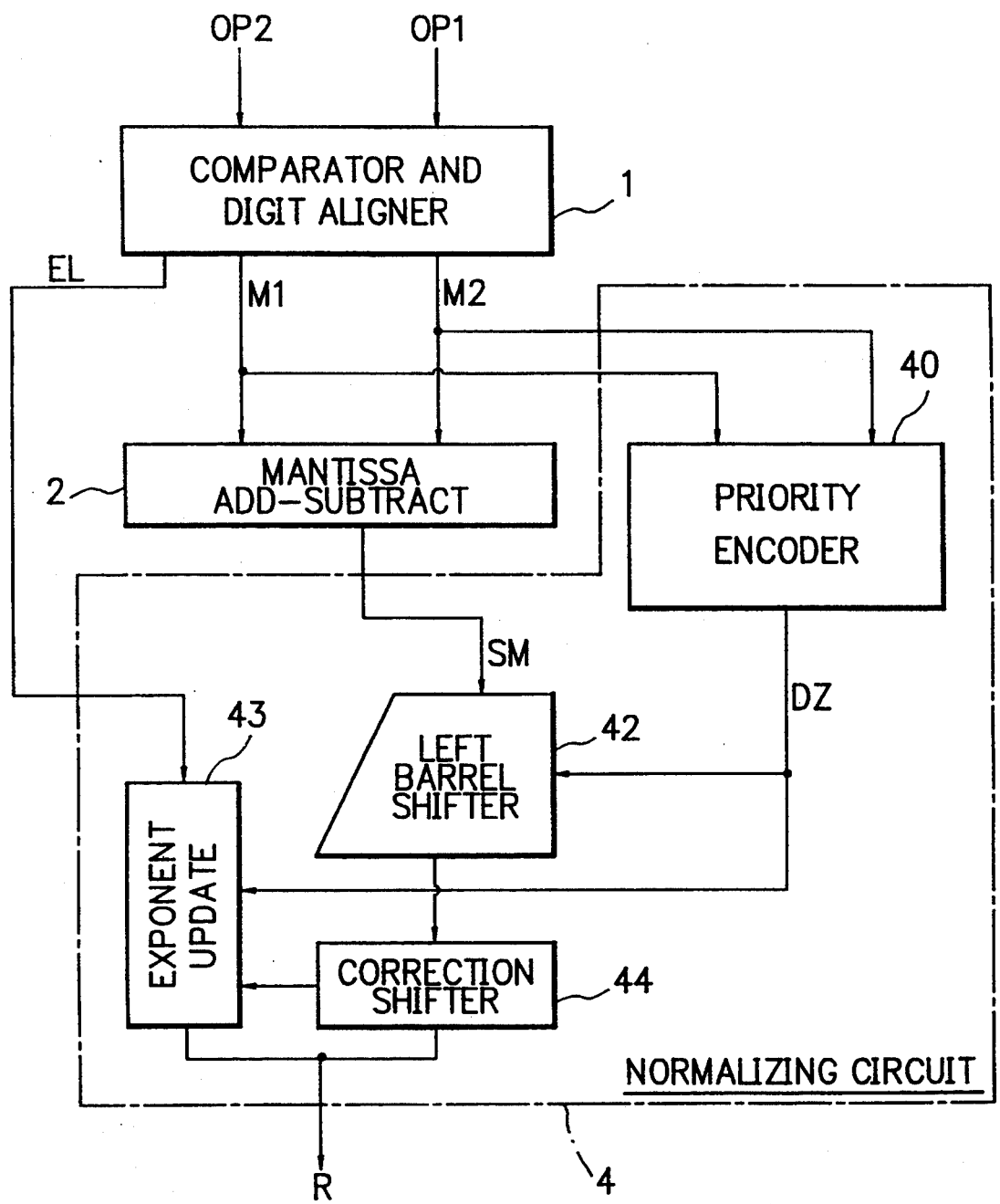
FIG. 3 is a block diagram of a floating-point adder-subtractor according to the present invention.

FIG. 3 shows one embodiment of a floating-point adder-subtractor according to the present invention. As shown in FIG. 8, the floating-point adder-subtractor comprises a comparator and digit aligner circuit 1, a mantissa add-subtract circuit 2 and a normalizing circuit 4 for performing the normalization by using the priority encoder of the present invention. The former two have similar constructions to the conventional ones.

The normalizing circuit 4 includes the priority encoder 40 of the present invention, as described above, a left barrel shifter 42, an exponent update circuit 43 and a correction shifter 44.

Next, the operation of the floating-point adder-subtractor described above will now be described in detail.

First, in a similar manner to the conventional example described above, the comparator and digit aligner circuit 1 compares two input operands OP1 and OP2 of floating-point data with each other to selectively output an exponent part EL of the larger operand and controls the digit positions of the mantissa parts of the input operands OP1 and OP2 to output the mantissas M1 and M2. Then, the mantissa add-subtract circuit 2 performs the adding or subtracting of the mantissas M1 and M2 output from the comparator and digit aligner circuit 1 to output an added or subtracted mantissa value SM. Then, the normalizing circuit 4 carries out the normalization of the added or subtracted mantissa value SM fed from the mantissa add-subtract circuit 2. That is, the left barrel shifter 42 shifts the input added or subtracted mantissa value SM to carry out the normalization of the mantissa. The priority encoder 40 calculates the shift amount for this normalization. The priority encoder 40 also performs the encoding in parallel with the subtraction operation of the mantissa add-subtract circuit 2 so as to output the leading zero number DZ of the difference between the mantissas M1 and M2 within an error of $-1$. Also, the exponent update circuit 43 adds or subtracts the leading zero number DZ to or from the exponent part EL to carry out the renew of the exponent. Since the leading zero number DZ can include the error of $-1$, as described above, in order to correct this error, one bit shift is executed by the correction shifter 44. When the error of $-1$ is included in the calculated leading zero number DZ, this is discriminated by the fact that the MSB of the output of the left barrel shifter 42 becomes '0', and the output of the left barrel shifter 42 is further shifted to the left by one bit to carry out the correction. As a result, the correct normalization can be performed.

In this embodiment, the priority encoder 40 calculates the leading zero number DZ only when the mantissa add-subtract circuit 2 performs the subtraction operation. When the mantissa add-subtract circuit 2 executes the addition operation, since the added or subtracted mantissa value SM never has a form of (000 ... 01xxx), it is needless to calculate the leading zero number DZ by the priority encoder 40. In this case, due to an overflow caused by the mantissa addition, only one bit shift to the left by the correction shifter 44 is required. By the above-described processing, the floating-point addition or subtraction operation of the two input operands OP1 and OP2 can be executed to output the arithmetic result R.

In comparison with the conventional floating-point adder-subtractor, since the delay time of the conventional priority encoder 31, inserted in series into the calculation processing can be cut, it is apparently understood that the quick processing can be achieved.

As described above, in the priority encoder according to the present invention, by adding the pre-encoder for calculating the leading zero number of the difference $D = X - Y$ between the two binary numbers X and Y ($X \geq Y$) within the error of $-1$, the processing time due to the calculation of $X - Y$ in the subtractor and the hardware amount can be reduced.

Further, in the floating-point adder-subtractor according to the present invention, since the normalization shifting processing can be executed just after the output of the subtraction result of the mantissa add-subtract circuit by operating the priority encoder in parallel with the mantissa add-subtract circuit, the delay time by the conventional priority encoder processing in series can be cut, and thus the quick processing can be achieved.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A priority encoder, comprising:

a pre-encoder circuit for inputting two n-bit binary numbers $X (= X_n, X_{n-1}, \ldots$ and $X_1)$ and $Y (= Y_n, Y_{n-1}, \ldots$ and $Y_1)$, wherein $X \geq Y$, and outputting an n-bit string $Q (= Q_n, Q_{n-1}, \ldots$ and $Q_1)$ to be either $Q_i = 1$ when a combination $(X_i, Y_i, X_{i-1}, Y_{i-1})$ of ith and (i−1)th digits of the binary numbers X and Y is one of (1, 0, 0, 0), (1, 0, 1, 0), (1, 0, 1, 1), (0, 1, 0, 0), (0, 1, 1, 1), and (0, 1, 1, 0), or $Q_i = 0$ otherwise, wherein $i = 1, 2, 3, \ldots, n$;

a priority encoder means for encoding a leading zero number of zeros continuously aligned from a most significant digit to a preceding position of a first "1" appeared by counting from the most significant digit of an input n-bit binary number so as to encode the bit string Q fed from said pre-encoder circuit, said priority encoder means outputting either a leading zero number of a difference between the two binary numbers X and Y or one smaller number than the leading zero number;

wherein said pre-encoder circuit comprises a plurality of unitary element encoders each having a first pair of inputs for inputting $X_i$ and $Y_i$, a second pair of inputs, a first output for outputting bit string $Q_i$, and a second output composed of a pair of signals, each said unitary element encoder being connected at said second pair of inputs to the second output of the adjacent unitary element encoder, for generating the bit string $Q_i$, from said unitary element encoder to which is inputted $X_i$ and $Y_i$ through an adjacent unitary element encoder to which is inputted $X_{i-1}$ and $Y_{i-1}$; and said each unitary element encoder includes first and second NAND gates respectively receiving $X_i$ and $Y_i$, first and second inverters respectively receiving $Y_i$ and $X_i$ and providing outputs to said first and second NAND gates respectively, outputs of said first and second NAND gates being connected to said second output of the unitary element encoder, third and fourth NAND gates connected to the second output of said adjacent unitary element encoder, third and fourth inverters respectively connected to outputs of said first and second NAND gates and providing outputs to said third and fourth NAND gates respectively, and a fifth NAND gate receiving as inputs outputs of said third and fourth NAND gates and providing an output to said first output.

* * * * *